United States Patent
Agrawal et al.

(10) Patent No.: US 8,355,384 B2
(45) Date of Patent: Jan. 15, 2013

(54) SYSTEM AND METHOD OF HANDOVER IN WIRELESS NETWORK

(75) Inventors: Dakshi Agrawal, Hawthorne, NY (US); Murtaza Zafer, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/894,909

(22) Filed: Sep. 30, 2010

(65) Prior Publication Data

US 2012/0082131 A1 Apr. 5, 2012

(51) Int. Cl.
*H04W 4/00* (2009.01)
*H04W 36/00* (2009.01)
(52) U.S. Cl. ......... 370/331; 455/436; 455/439; 455/442
(58) Field of Classification Search .................. 370/331; 455/436, 439, 442
See application file for complete search history.

(56) References Cited

U.S. PATENT DOCUMENTS

| | | | |
|---|---|---|---|
| 6,907,501 B2 | 6/2005 | Tariq et al. | |
| 7,525,940 B2 | 4/2009 | Trossen et al. | |
| 7,801,530 B2 * | 9/2010 | Oswal et al. | 455/437 |
| 8,134,970 B2 * | 3/2012 | Jalil et al. | 370/331 |
| 2003/0114158 A1 * | 6/2003 | Soderbacka et al. | 455/436 |
| 2006/0262793 A1 | 11/2006 | Vare et al. | |
| 2007/0140173 A1 * | 6/2007 | Tomizu | 370/331 |
| 2007/0189312 A1 * | 8/2007 | Acharya et al. | 370/401 |
| 2008/0310365 A1 * | 12/2008 | Ergen et al. | 370/331 |
| 2009/0005020 A1 * | 1/2009 | McGowan et al. | 455/414.3 |
| 2009/0109921 A1 * | 4/2009 | Bowen | 370/331 |
| 2009/0116448 A1 | 5/2009 | Nam et al. | |

OTHER PUBLICATIONS

Wallenius, E. R., "Control and Management of Multi-Access Wireless Network", 2005, pp. 1-94.
Soliman, et al., "Application of Synchronous Dynamic Encryption System in Mobile Wireless Domains", 2005, pp. 24-30.
Kawarasaki, et al. Metadata Driven Seamless Content Handover in Ubiquitous Environment, International Symposium on Applications and the Internet (SAINT'04), 2004, IEEE/IPSJ, pp. 1-4.
Tarkoma, et al. "On the Cost and Safety of Handoffs in Content-Based Routing Systems", Computer Networks 51, 2007, pp. 1459-1482.
Kobayashi, et al., "Efficient Support for Pipelined Requests in Content-Based Switches Using Asymmetric TCP Splicing", Networking Research Laboratories, vol. E86-8, No. 6, Jun. 2003, pp. 1812-1820.
Kerdiapanan, et al., "Content-Based Load Balancing with Multicast and TCP-Handoff" King Mongkut's Institute of Technology Ladkrabang, IEEE, 2003, pp. 348-351.
Sesia, et al. "LTE: The UMTS Long Term Evolution, From Theory to Practice", 2009, pp. 24-30.

* cited by examiner

*Primary Examiner* — Kenny Lin
(74) *Attorney, Agent, or Firm* — Preston J. Young, Esq.; McGinn IP Law Group, PLLC (57) ABSTRACT

A method of handover in a wireless network includes in response to a request for data from a user equipment connected to a first access point in the plurality of access points, determining whether the first access point is storing the requested data and if the first access point is storing the requested data, then serving the user equipment with the first access point, if it is determined that the first access point is not storing the requested data, then determining whether a second access point in the plurality of access points is storing the requested data, and if it is determined that the second access point is storing the requested data, then initiating a handover of the user equipment to the second access point.

25 Claims, 8 Drawing Sheets

| Content | Access Points Storing the Content in Local Cache | Number of Times Content has been Requested | | |
|---|---|---|---|---|
| | | Last 30 days | Last 180 days | Last Year |
| A | 28 | 12 | 43 | 112 |
| B | 43 | 28 | 60 | 123 |
| C | 47 | 6 | 18 | 44 |
| | | | | |
| | | | | |
| | | | | |
| | | | | |

SYSTEM AND METHOD OF HANDOVER IN WIRELESS NETWORK

BACKGROUND OF THE INVENTION

1. Field of the Invention

The present invention relates to a method of handover in a wireless network, and more particularly, a method of handover which includes, if it is determined that a first access point is not storing requested data and that a second access point is storing the requested data, then initiating a handover of the user equipment to the second access point.

2. Description of the Related Art

Demand for wireless services is increasingly rapidly as evident by the tremendous growth in recent years in smart mobile phones. This explosive growth in data traffic and its bandwidth requirements have already saturated the current generation of cellular networks and will continue to pose a major bandwidth challenge for next generation of cellular networks (e.g., Long Term Evolution (LTE) based networks). Thus, while LTE networks will have greater capacity than current networks, they will carry significantly larger data traffic over both the radio and the backhaul links.

LTE network architecture consists of user equipments (UE) (e.g., handheld devices such as a mobile phone, laptops, etc.) that connect to the eNodeB's which are access points, which then connect to the backhaul core network. One of the major problems in such a network is for UE to decide which eNodeB to connect to and the transfer of this connection from one eNodeB to another, which is referred to as "handover" in cellular terminology.

In addition, future wireless devices will be multi-standard and will have the capabilities to operate on different wireless technologies, such as Wi-Fi, WiMax, etc. The UEs will then have to choose an access point among many such technologies.

Current solutions to handover and eNodeB access are based on network/radio characteristics and/or policy based priorities. For example, a UE generally connects to an eNodeB for which the radio signal strength is above a threshold or with the highest signal strength. A UE may also connect to eNodeBs with some priority depending on the subscription category, where premium subscribers have availability of more access points than regular subscription.

SUMMARY OF THE INVENTION

In view of the foregoing and other problems, disadvantages, and drawbacks of the aforementioned conventional systems and methods, an exemplary aspect of the present invention is directed to a method of handover which may avoid repeatedly transmitting the same data over the network, and may thereby help to save bandwidth between the content cache server and the access point.

The inventors have determined that a drawback of current solutions for access point selection is that the solutions do not take into account the data being accessed by the UE and hence the solutions are application agnostic. Thus, a problem with the current methodology is that the same data may need to be transported over the network several times.

For example, it has been observed that a large amount of multimedia content downloaded over the internet include popular videos, and these are accessed by many users. Over the cellular network, this data would then need to be transported for every requesting UE from the content cache server (in the backhaul) to the corresponding access point to which the UE is connected. This would waste precious bandwidth between the content cache server and the access point.

An exemplary aspect of the present invention is directed to a method of handover in a wireless network. The method includes in response to a request for data from a user equipment connected to a first access point in the plurality of access points, determining whether the first access point is storing the requested data and if the first access point is storing the requested data, then serving the user equipment with the first access point, if it is determined that the first access point is not storing the requested data, then determining whether a second access point in the plurality of access points is storing the requested data, and if it is determined that the second access point is storing the requested data, then initiating a handover of the user equipment to the second access point.

Another exemplary aspect of the present invention is directed to wireless network including a user equipment for making a request for data, and a plurality of access points including a first access point which receives the request for data from the user equipment, and determines whether the first access point is storing the requested data, and if the first access point is storing the requested data then the first access point serves the user equipment. The network also includes a determining device which, if the first access point determines that the first access point is not storing the requested data, determines whether a second access point in the plurality of access points is storing the requested data, and if the determining device determines that the second access point is storing the requested data, then the determining device initiates a handover of the user equipment to the second access point.

Another exemplary aspect of the present invention is directed to a method of handover in a wireless network including a plurality of user equipments, a plurality of access points serving the plurality of user equipments, and a packet gateway node serving the plurality of access points. The method includes storing in a content-based handover entity, information regarding data being stored in a local cache of the plurality of access points, transmitting a request for content from a user equipment in the plurality of user equipments to a first access point in the plurality of access points, determining whether the local cache of the first access point is storing the content and if it is determined that the local cache is storing the content, then serving the user equipment with the first access point, if it is determined that the local cache is not storing the content, then querying the content-based handover entity to determine whether other access points in the plurality of access points which are in a vicinity of the user equipment include a local cache storing the requested content, if it is determined that the other access points in the plurality of access points in the vicinity do not include a local cache storing the requested content, then requesting the content from the packet gateway node and serving the user equipment with the first access point, if it is determined that the other access points in the plurality of access points in the vicinity include a local cache storing the requested content, then performing an optimization to select an optimum access point from among the other access points in the vicinity which include the local cache storing the requested content, and initiating a handover of the user equipment to the selected optimum access point and serving the user equipment with the selected optimum access point.

Another exemplary aspect of the present invention is directed to a wireless network including a plurality of user equipments including a user equipment for making a request for data, a plurality of access points including a first access point which receives the request for data from the user equipment, and which determines whether the first access point is storing the requested data and if the first access point is storing the requested data, then the first access point serves the user equipment, a mobility management entity and serving gateway node connected to the plurality of access points and managing a mobility (e.g., transfer of a user equipment between access points) of the plurality of user equipments across the plurality of access points and serves as a serving gateway for data, a packet gateway node connected to the mobility management entity and serving gateway node, a core IP network connected to the packet gateway node, the packet gateway node serving as a gateway to the core IP network, and a content-based handover entity which is included in one of the packet gateway node and the mobility management entity and serving gateway node, and stores a hash-table including information regarding data being stored at the plurality of access points, and if the first access point determines that the first access point is not storing the requested data, then the first access point queries the hash-table to determine whether a second access point in the plurality of access points is storing the requested data, and if the first access point determines that the second access point is storing the requested data, then the first access point initiates a handover of the user equipment to the second access point.

Another exemplary aspect of the present invention is directed to a programmable storage medium tangibly embodying a program of machine-readable instructions executable by a digital processing apparatus to perform a method of handover in a wireless network, the method includes in response to a request for data from a user equipment connected to a first access point in the plurality of access points, determining whether the first access point is storing the requested data and if the first access point is storing the requested data, then serving the user equipment with the first access point, if it is determined that the first access point is not storing the requested data, then determining whether a second access point in the plurality of access points is storing the requested data, and if it is determined that the second access point is storing the requested data, then initiating a handover of the user equipment to the second access point.

With its unique and novel features, the present invention provides a method of handover which may avoid repeatedly transmitting the same data over the network, and may thereby help to save bandwidth between the content cache server and the access point.

BRIEF DESCRIPTION OF THE DRAWINGS

The foregoing and other objects, aspects and advantages will be better understood from the following detailed description of the embodiments of the invention with reference to the drawings, in which:

FIG. 2B illustrates a determining device 230, FIG. 2C illustrates a determining device 230 in an intermediate node 240.

DETAILED DESCRIPTION OF THE
EXEMPLARY EMBODIMENTS OF THE
INVENTION

Referring now to the drawings, FIGS. 1-11 illustrate the exemplary aspects of the present invention.

Figure 1:
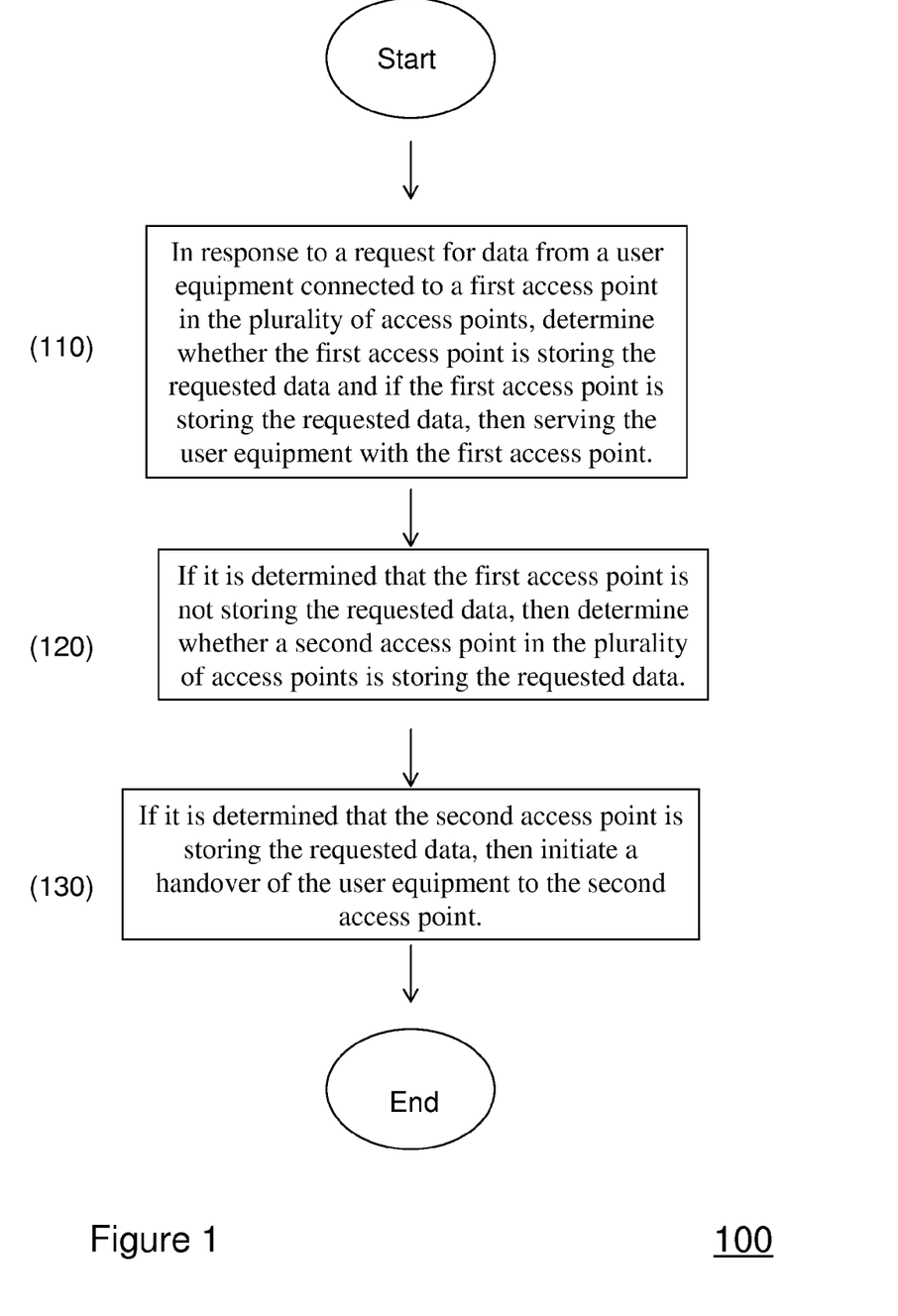
FIG. 1 illustrates a method 100 of handover in a wireless network, in accordance with an exemplary aspect of the present invention.

As illustrated in FIG. 1, an exemplary aspect of the present invention is directed a method 100 of handover in a wireless network, according to an exemplary aspect of the present invention. As illustrated in FIG. 1, the method 100 of handover includes in response to a request for data from a user equipment connected to a first access point in the plurality of access points, determining (110) whether the first access point is storing the requested data and if the first access point is storing the requested data, then serving the user equipment with the first access point, if it is determined that the first access point is not storing the requested data, then determining (120) whether a second access point in the plurality of access points is storing the requested data, and if it is determined that the second access point is storing the requested data, then initiating (130) a handover of the user equipment to the second access point.

Figure 2A:
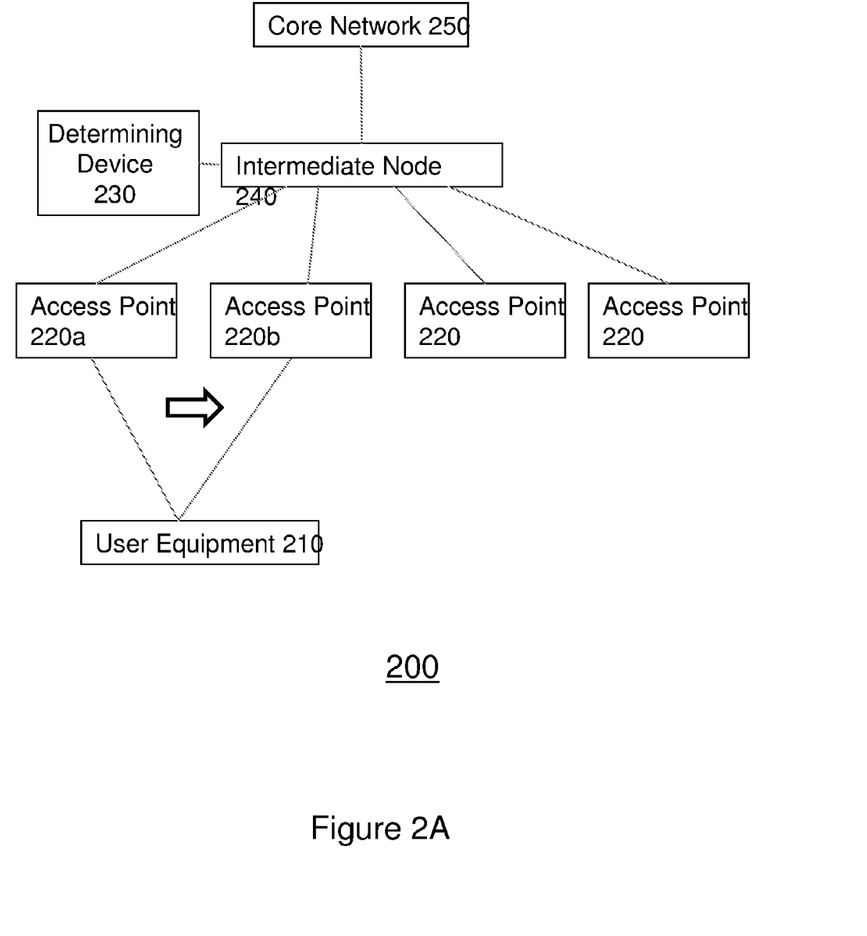
FIG. 2A illustrates a network 200, in accordance with an exemplary aspect of the present invention.

FIG. 2A illustrates a wireless network 200 according to another exemplary aspect of the present invention. The wireless network 200 includes a user equipment 210 for making a request for data, and a plurality of access points 220 (e.g., base stations) including a first access point 220a which receives the request for data from the user equipment, and which determines whether the first access point 220a is storing the requested data and if the first access point 220a is storing the requested data, then the first access point 220a serves the user equipment 210.

The network 200 also includes a determining device 230. If the first access point 220a determines that the first access point 220a is not storing the requested data, then the determining device 230 determines whether a second access point 220b in the plurality of access points 220 is storing the requested data, and if the determining device 230 determines that the second access point 220b is storing the requested data, then the determining device 230 initiates a handover of the user equipment 210 to the second access point 220b.

Figure 2B:
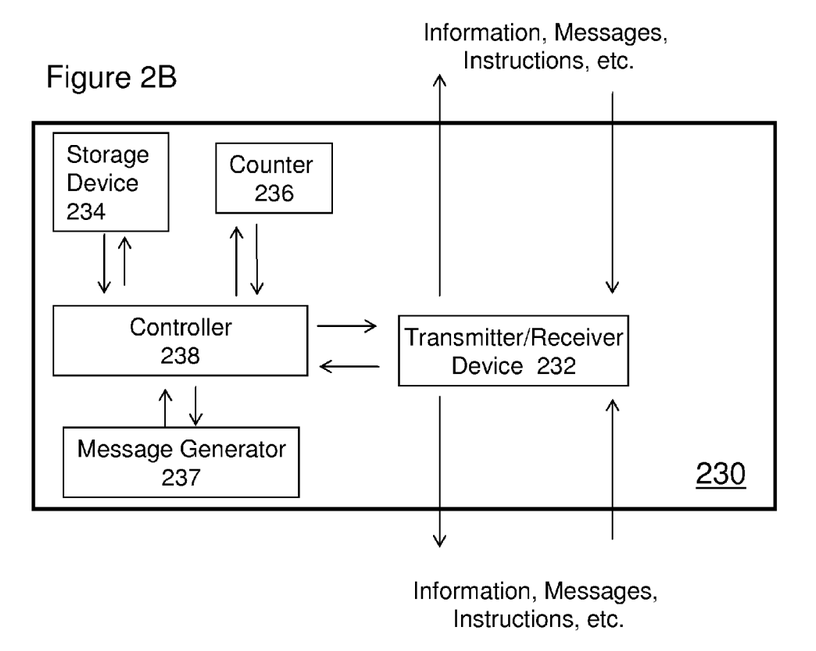

As illustrated in FIG. 2B, the determining device 230 may include a storage device 234 (e.g., a readable and writeable memory device such as a Random Access Memory (RAM) or a magnetic disk (e.g., hard drive)) which stores information regarding data being stored (e.g., in a local cache) at the plurality of access points 220. The determining device 230 may also include a controller 238 (e.g., microcontroller or microprocessor) which accesses the storage device 234 to determine whether the second access point 220b in the plurality of access points 220 is storing the requested data.

The determining device 230 may also include a counter 236 and a message generator 237. The determining device 230 may also include a Transmitter/Receiver Device 232 for transmitting and/or receiving (e.g., by wire or wirelessly transmitting and/or receiving) information, messages, instructions, etc.

Figure 2C:
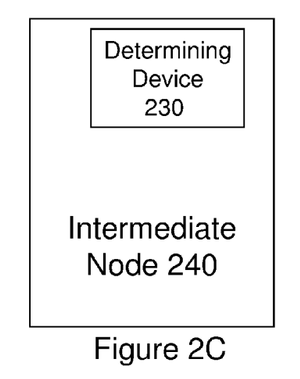
Figure 2D:
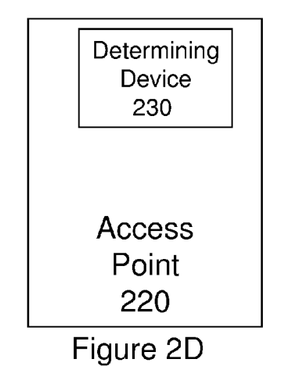
FIG. 2D illustrates a determining device 230 in an access point 220a, in accordance with an exemplary aspect of the present invention.

As illustrated in the exemplary aspect of FIG. 2A, the determining device 230 may be connected to an intermediate node 240 in the network, which is located between the access points 220 and the core network 250. For example, the determining device 230 may be physically located within the intermediate node 240 (e.g., formed within a housing of a packet-gateway node) (as illustrated in FIG. 2C) or wirelessly connected (e.g., via radio signal) to the intermediate node 240, or connected by a wire to the intermediate node 240, or connected through a communication network (e.g. internet) to the intermediate node 240. In another exemplary aspect of the invention, the determining device 230 may be connected to the plurality of access points 220. For example, the determining device 230 may be physically located within the plurality of access points 220 (as illustrated in FIG. 2D), or wirelessly connected, or connected through a wire, or connected through a communication network to the plurality of access points 220.

The determining device 230 may include, for example, a functional box that is added to a cellular system (e.g., wireless network or a plurality of wireless networks) and may be used to solve the above problem and optimize bandwidth utilization by making user equipment access and handovers dependent on the underlying data/application request.

Further, the determining device 230 may determine whether the second access point 220b in the plurality of access points 220 is storing the requested data by referring to the storage device 234. For example, the storage device 234 may store information regarding data being stored (e.g., in a local cache) at the plurality of access points 220, and the determining device 230 (e.g., the controller 238) may refer to the information stored in the storage device 234 to determine whether the second access point 220b in the plurality of access points 220 is storing the requested data. Further, the storage device 234 may be connected to the determining device 230 and located separately from the determining device 230, or the storage device 234 may be included within the determining device 230 as illustrated in FIG. 2B.

For example, the storage device 234 may store the information regarding data being stored at the plurality of access points 220 in the form of a list or table, such as a hash-table. For example, the hash-table may include a data structure that uses a hash function to map the content to the access point 220 storing the content in the local cache of the access point 220.

Figure 3:
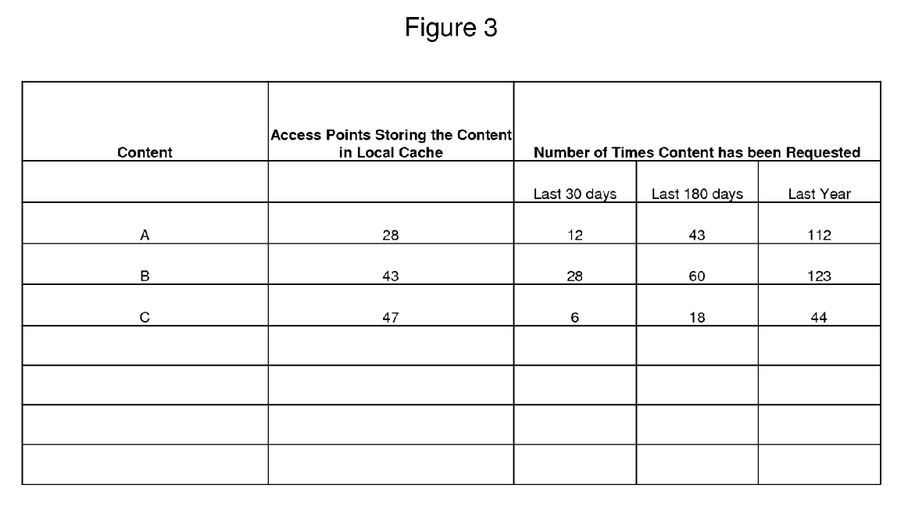
FIG. 3 illustrates a hash-table that may be used to store information regarding data being stored in an access point, in accordance with an exemplary aspect of the present invention.

FIG. 3 illustrates a hash-table 300 for storing information regarding data being stored at the plurality of access points 220, according to an exemplary aspect of the present invention. As illustrated in FIG. 3, the information may include the Content, and the Access Points Storing the Content in their local cache.

The counter 236 may be used in the determining device 230 for counting the number of times that the content has been requested by user equipments in the network. Thus, the information stored in the hash-table may also include The Number of Times that the Content has been Requested over a time period (e.g., 30 days, 180 days and 1 year). The message generator 237 in the determining device 230 may also periodically generate and transmit a download message to the owner of the content (e.g., the owner of the website from which the content was obtained) so that the owner may keep record of the number of times that the content has been downloaded.

The determining device 230 may also have a self-updating feature so that when a request is made for content, if none of the access points 220 are storing the content, then the access point 220 obtains the content from the core network and transmits the content to the user equipment making the request. The access point 220 may also (e.g., at the time of obtaining the content), store the obtained content in the local cache of the access point 220 and send an update message to the determining device 230 that the content has been added to the access point's local cache.

For example, the Transmitter/Receiver Device 232 may be used in the determining device 230 for wirelessly receiving the update message transmitted from the access point 220. Alternatively, the update message may be transmitted to the intermediate node 240 which then transmits the message to the determining device 230.

In addition, the access point 220 may periodically delete old content (e.g., content that has not been requested within a certain time frame, such as the last 30 days) from its local cache in order to make room for additional content. At the time of deleting the content, the access point 220 may transmit an update message to the determining device 230 so that the determining device 230 can update the information stored in the determining device 230 (e.g., the information stored in the hash-table of the determining device 230).

The controller 238 may be used in the determining device 230 for controlling (e.g., managing) the content stored in the local cache of the access points 220. The controller 238 may be, for example, physically part of the determining device 230, or it may be a separate entity in the network which coordinates with the determining device 230 through the network. Thus, for example, before an access point 220 could delete content from its cache, the access point 220 would transmit a delete request to the determining device 230 which would then be required to approve of the delete request. The determining device 230 (e.g., through the controller 238) may also initiate and coordinate a transfer of content, so that content could be moved from a first access point 220a to a second access point 220b, to optimize storage of content across the plurality of access points 220. The determining device 230 through its controller 238 may also initiate updating (e.g., periodic) of the content at the access points 220 with new content from the content cache server in the core network 250.

A main idea of the present invention may include making handovers in cellular networks dependent on the data being accessed by the user equipment (UE). That is, the present invention may make handovers cognizant of the higher-layer application. This can be achieved by maintaining (e.g., in the determining device 230) a hash-table of the content being cached at different access points (e.g., eNodeBs), and making a handover decision dependent on the data request being made by the UE.

For example, if a UE connected to a certain access point makes a data request, then the access point serves the UE if the access point has the content locally cached (e.g., stored in cache memory at the location of the access point). Otherwise, the access point makes a query to the hash-table for other access points (e.g., access points which are in the geographic vicinity and/or are in the same network as the access point) that may have the data locally cached.

If the first access point finds a second access point that has the data locally cached, then the first access point initiates a handover of the UE to the second access point. This handover decision can be further optimized by taking into account other parameters as well, including, for example, radio signal strengths (e.g., radio signal strength between the plurality of other access points and the user equipment (UE)), properties of the wireless network, and policy based priorities (e.g., policy-based priorities assigned to the plurality of other access points).

An important advantage of the present invention is that the present invention may allow for an efficient utilization of the bandwidth available between the access points and the core network (e.g., core wired IP network), which has been traditionally a heavy-loaded part of the network.

This is because the links between access points (e.g., eNodeBs) and the core network (e.g., core wired IP network) may aggregate data from and to hundreds of UEs across tens of cell regions. At the same time, a significant portion of multimedia traffic downloaded over the internet is popular content which is accessed by thousands of users.

While this content is cached by servers in the core network 250, each access point (e.g., eNodeB) would still need to access this data from the cache server. However, by referring to stored information as in the claimed invention (e.g., by querying the hash-table), the present invention may enable handovers based on a content request which may result in significant bandwidth saving over these intermediate links (e.g., links between the access points 220 and the core network 250), thus, increasing the capacity of the network (e.g., the 3G/4G cellular network).

Figure 4:
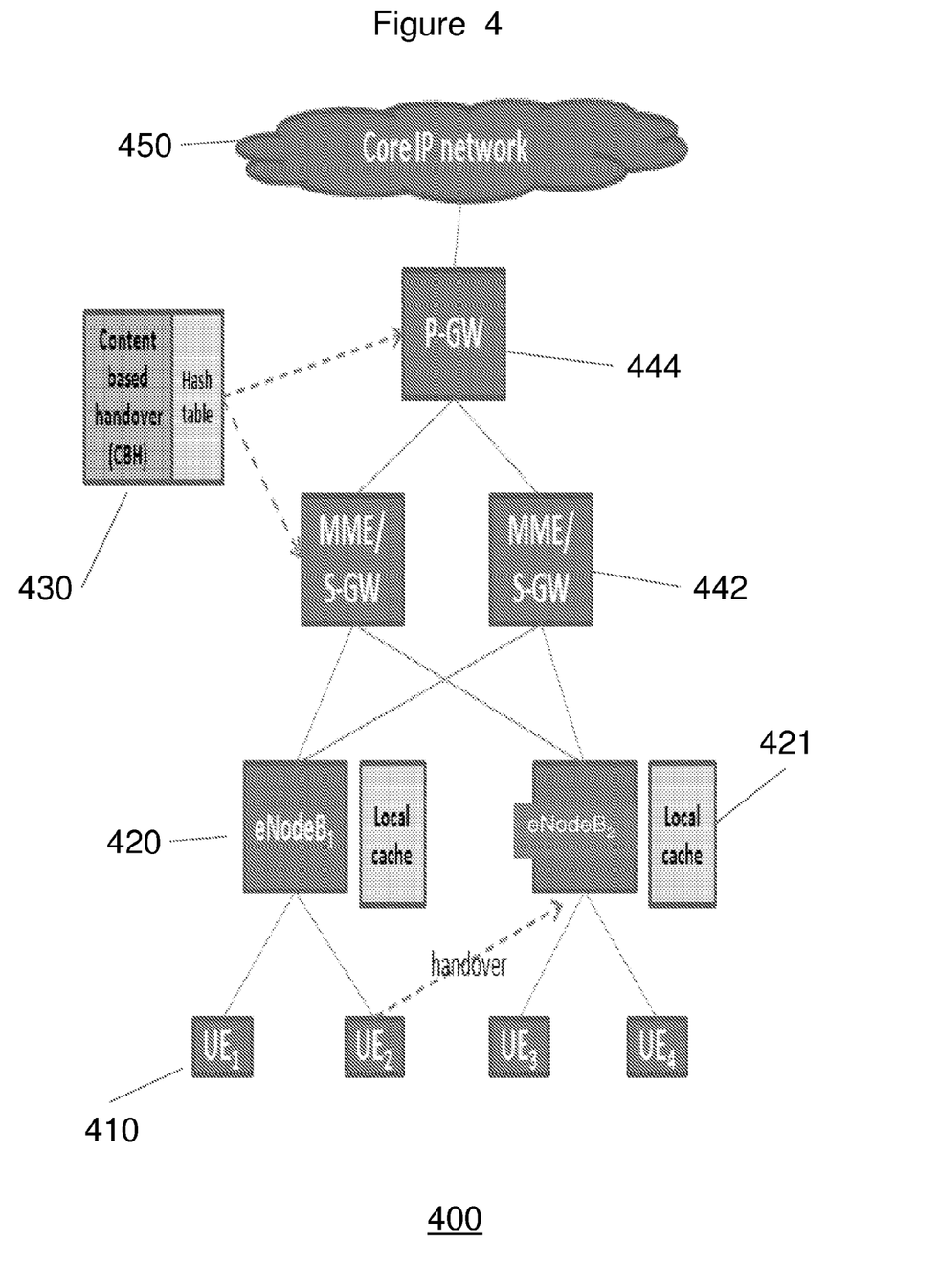
FIG. 4 illustrates a network 400, in accordance with an exemplary aspect of the present invention.

FIG. 4 illustrates a network 400 according to another exemplary aspect of the present invention. As illustrated in FIG. 4, the network 400 includes a Long Term Evolution (LTE) network which includes a plurality of user equipments 410 ($UE_1 \ldots UE_4$), a plurality of eNodeBs 420 ($eNodeB_1 \ldots eNodeB_2$) and a local cache 421 connected to the eNodeBs 420, a plurality of mobility management entity and serving gateway nodes 442 (MME/S-GWs) connected to the plurality of eNodeB 420, and a packet gateway node 444 (P-GW) connected to the MME/S-GWs 442 and to the Core IP Network 450. The network 400 also includes a Content Based Handover (CBH) entity 430 (e.g., similar to determining device 230) which stores information regarding data being stored in the local cache 421 of the plurality of access points 420.

FIG. 4 gives a description of the architecture of the network 400 (e.g., an LTE network). The network components include user equipments 410 (UE) which represent the user equipment such as handheld device (e.g., mobile phone), laptop, etc., eNodeB 420 which represent the access-point or the base-station, MME/S-GW 442 which represent the mobility-management-entity and the serving-gateway which manages mobility (e.g., a transfer) of the UEs 410 across different eNodeBs 420 and also acts as a serving gateway for data, P-GW 444 which represent the packet-gateway node which acts as the gateway to the core-IP-network 450.

Each UE 410 is connected to one eNodeB 420 through the wireless radio link. Several eNodeBs 420 connect to the MME/S-GW node 442. Thus, each MME/S-GW 442 may serve several eNodeBs 420 (e.g., access-points). MME/S-GW 442 then connects to a P-GW 444, which then connects to the core IP network 450. (It should be understood that by "connects" herein, it is intended to mean connection through a wire, fiber-optic link, wireless or any other communication technology).

Thus, an important feature of the present invention may include a functional box which is shown on the left in FIG. 4 as a content-based-handover (CBH) entity 430. This box can be a part of either the MME/S-GW node 442 or the P-GW node 444, or any other node in the wireless network 400, depending on the actual implementation, and it provides the functionality to enable content based handover of UEs 410. Each eNodeB 420 maintains the local cache 421 which stores the data it has downloaded and/or served to the UEs 421. As an example, this local cache 421 can be time-window based where the eNodeB 420 keeps the data over a certain time-interval in the past or it can keep data based on content priority in its respective cell, or it can keep data according to global priority as determined by other control/management entities in the wireless network 400.

The CBH 430 may include a hash-table (or an equivalent construct) which keeps track of the local cache 421 of each eNodeB 420 that is served by the CBH 430. For example, if CBH 430 is part of MME/S-GW 442, then the CBH 430 can keep track of local caches 421 of all eNodeBs 420 in the hierarchy below the MME/S-GW 442 (e.g., connected to the MME/S-GW 442), and if CBH 430 is part of P-GW 444, then CBH 430 can keep track of local caches 421 of all eNodeBs 420 in the hierarchy below the P-GW 444.

Figure 5:
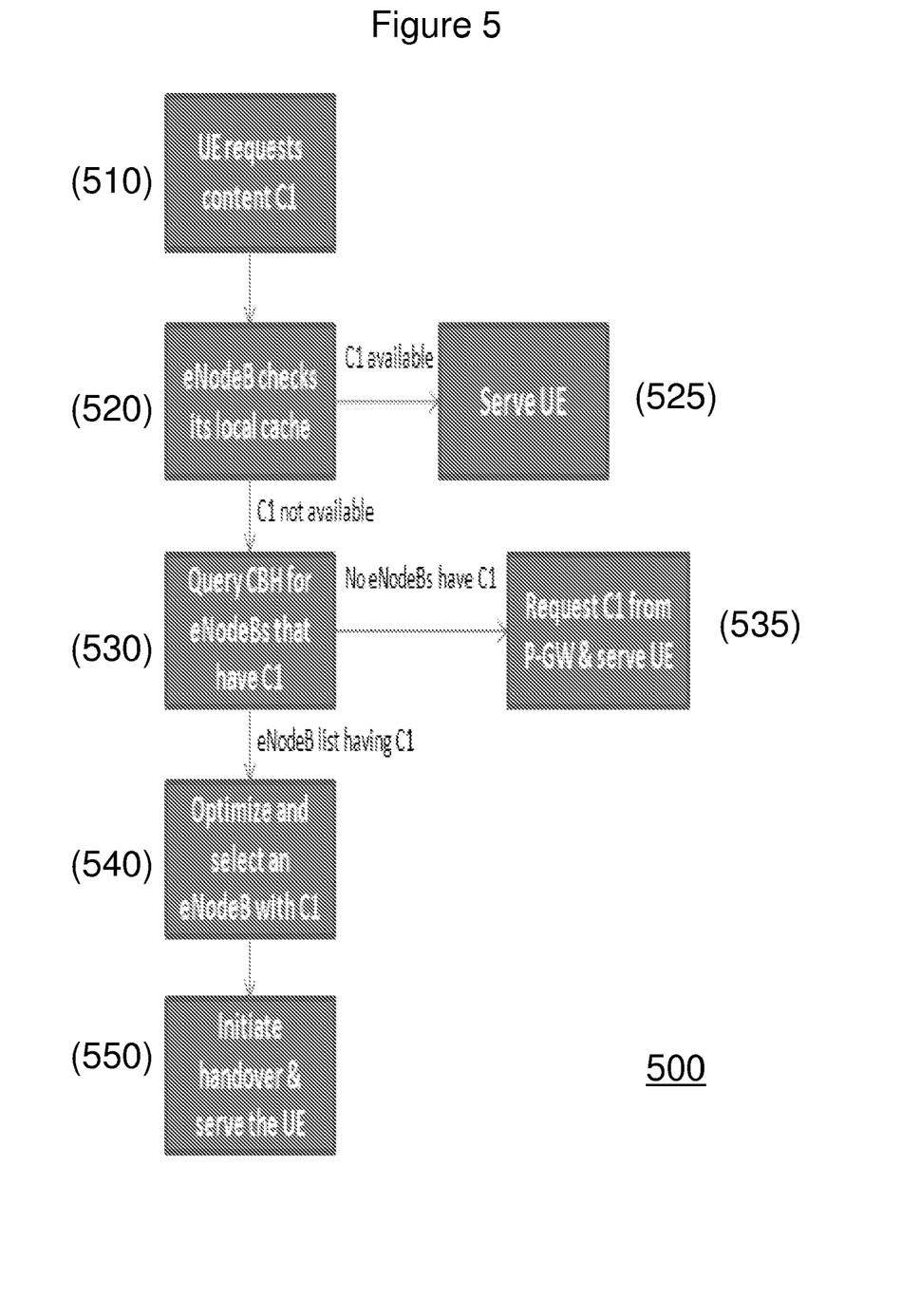
FIG. 5 illustrates a method 500 of handover in a wireless network, in accordance with an exemplary aspect of the present invention.

FIG. 5 illustrates a method 500 of handover (e.g., a flowchart), according to an exemplary aspect of the present invention. That is, FIG. 5 illustrates the main steps of the handover process of an exemplary aspect of the present invention (e.g., the handover process in the network 400).

As illustrated in FIG. 5, in the method 500, the UE 410 requests (510) content C1 to the eNodeB/access-point 420 to which the UE 410 is connected. The eNodeB 420 checks (520) its local cache 421 for C1. If C1 is available (e.g., stored in the local cache 421 of eNodeB), then eNodeB 420 serves (525) the UE 410.

Otherwise, the eNodeB 420 queries (530) the CBH 430 for other eNodeBs/access-points in the vicinity that have C1 in their local caches. If no eNodeBs have C1, then eNodeB 420 initiates (535) a request of C1 from P-GW 444 and serves UE (535). Otherwise, from the list of eNodeBs/access-points with C1, an optimization (540) is performed to select the best eNodeB.

This optimization (540) can be done either by the CBH 430 or by the requesting eNodeB 420 depending on the implementation. The optimization (540) can involve taking into account other parameters such as radio signal strengths, network properties, policy based priorities over the obtained list to select the best eNodeB. Furthermore, this optimization (540) can also take into account control parameters such as changing the transmit power, modulation and other features of the wireless devices to obtain the best operating point.

A handover may then be initiated (550) and the UE 410 is then connected to the optimally selected eNodeB which then serves the UE 410 with the content C1. It should be noted that the invention is not limited to specific eNodeBs, but rather generally to access-points and can involve handovers between different radio technologies, such as handover from LTE network onto a Wi-Fi Network, or from a LTE network onto a WiMax network, or from a 3G to a 4G network, and vice-versa.

Figure 6:
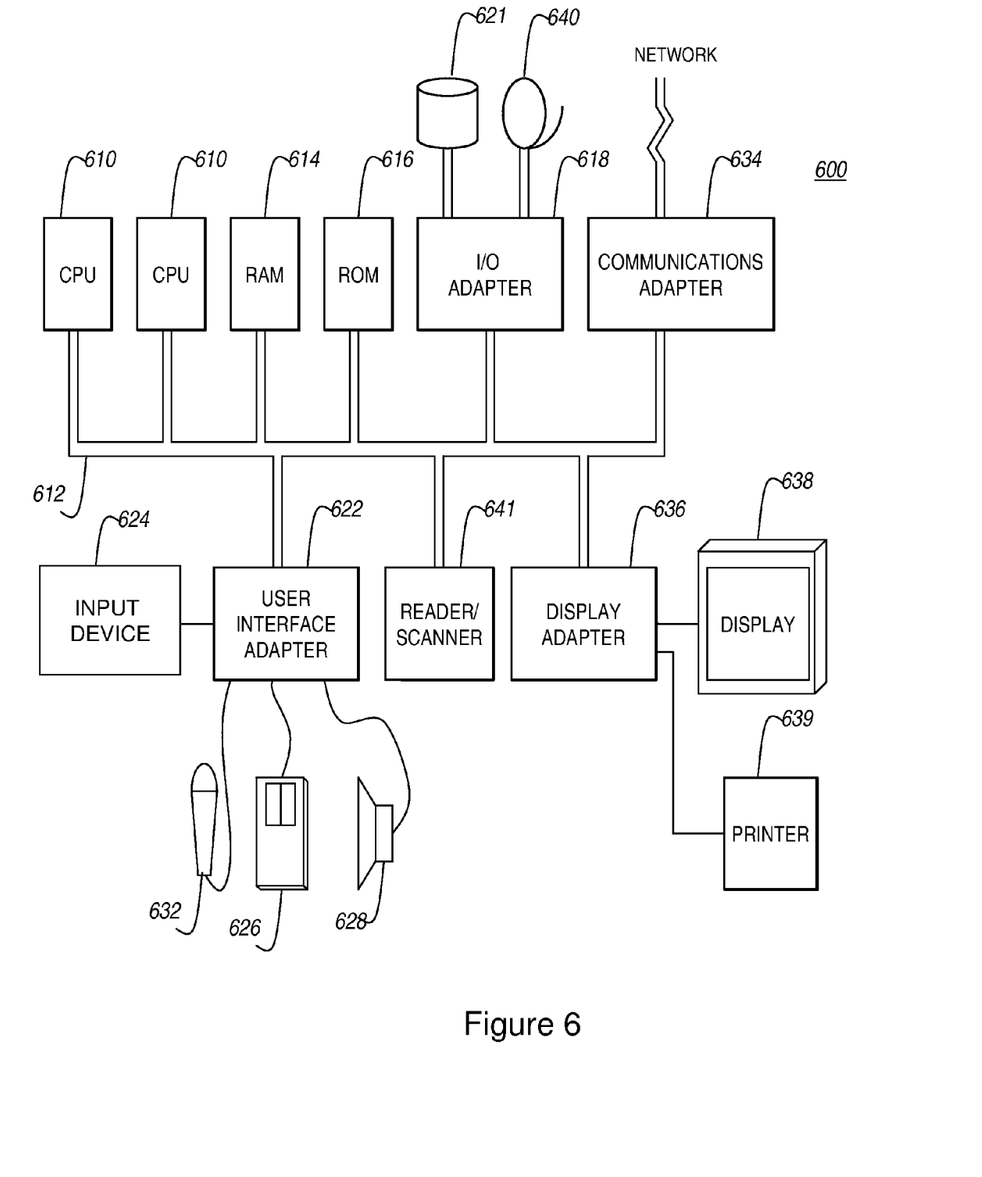
FIG. 6 illustrates a typical hardware configuration 600 that may be used to implement the network and method (e.g., network 200, network 400, method 100 and method 500), in accordance with an exemplary aspect of the present invention.

Referring now to FIG. 6, system 600 illustrates a typical hardware configuration which may be used for implementing the network and method of the present invention (e.g., network 200, network 400, method 100 and method 500). The configuration has preferably at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 628, speaker 628, microphone 632, pointing stick 627 and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 611 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 611 and hardware above, to perform the method of the invention.

Figure 7:
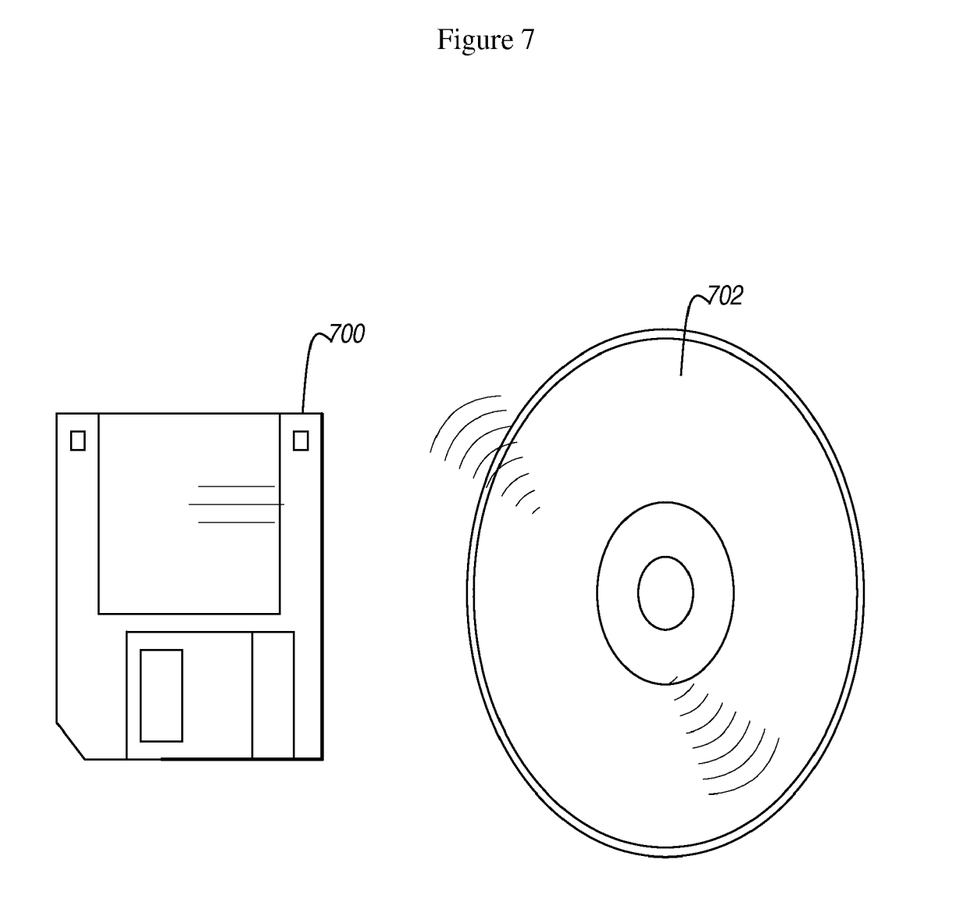
FIG. 7 illustrates a magnetic data storage diskette 700 and compact disc (CD) 702 that may be used to store instructions for performing the inventive method of the present invention (e.g., method 100 and method 500), in accordance with an exemplary aspect of the present invention.

This signal-bearing media may include, for example, a RAM contained within the CPU 611, as represented by the fast-access storage for example. Alternatively, the instructions may be contained in another signal-bearing media, such as a magnetic data storage diskette 700 or compact disc 702 (FIG. 7), directly or indirectly accessible by the CPU 611.

Whether contained in the computer server/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may include software object code, compiled from a language such as C, C++, etc.

With its unique and novel features, the present invention may provide a method of handover which may avoid repeatedly transmitting the same data over the network, and may thereby help to save bandwidth between the content cache server and the access point.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of handover in a wireless network, comprising:
    in response to a request for data from a user equipment connected to a first access point in the plurality of access points, determining whether the first access point is storing the requested data and if the first access point is storing the requested data, then serving the user equipment with the first access point;
    if it is determined that the first access point is not storing the requested data, then determining whether a second access point in the plurality of access points is storing the requested data; and
    if it is determined that the second access point is storing the requested data, then initiating a handover of the user equipment to the second access point.

2. The method of claim 1, further comprising:
    storing information about the data being stored at the plurality of access points in the wireless network,
    wherein the determining of whether the second access point is storing the requested data comprises referring to the stored information.

3. The method of claim 2, wherein the storing of the information includes storing the information in a hash-table, and the referring to the stored information includes querying the hash-table by the first access point.

4. The method of claim 3, wherein the wireless network further comprises a content-based handover entity which includes the hash-table storing the information.

5. The method of claim 4, wherein the wireless network further includes a mobility management entity and serving gateway node connected to the first access point, and a packet gateway node connected to the mobility management entity and serving gateway node, and
    wherein the content-based handover entity is included in one of the packet gateway node and the mobility management entity and serving gateway node.

6. The method of claim 5, wherein the wireless network further comprises a core IP network and a plurality of user equipments including the user equipment, and
    wherein the serving gateway node manages a mobility of the plurality of user equipments across the plurality of access points and acts as a serving gateway for data, and the packet gateway node acts as a gateway to the core IP network.

7. The method of claim 5, wherein the content-based handover entity is included in the packet gateway node and keeps track of the local cache of each access point in the plurality of access points that is served by the packet gateway node.

8. The method of claim 1, further comprising:
    if it is determined that a plurality of other access points in the plurality of access points are storing the requested data, then selecting an optimum access point from among the plurality of other access points, and
    initiating a handover of the user equipment to the selected optimum access point.

9. The method of claim 8, wherein the selecting of the optimum access point is performed by one of the content-based handover entity and the first access point.

10. The method of claim 9, wherein the selecting of the optimum access point is based on a plurality of parameters.

11. The method of claim 10, wherein the plurality of parameters comprises radio signal strength between the plurality of other access points and the user equipment, properties of the wireless network, and policy-based priorities assigned to the plurality of other access points.

12. The method of claim 1, wherein the network comprises a Long Term Evolution (LTE) based network, and the first access point comprises an eNodeB which maintains a local cache which stores data which has been downloaded by the first access point.

13. The method of claim 12, wherein the local cache comprises one of a time-window based local cache in which the eNodeB stores data over a time-interval, and a priority based local cache in which the eNodeB stores data based on a content priority in a respective cell.

14. The method of claim 1, wherein the user equipment comprises one of a handheld device and a laptop computer, and the requested data comprises requested multimedia data.

15. A wireless network, comprising:
a user equipment for making a request for data;
a plurality of access points including a first access point which receives the request for data from the user equipment, and determines whether the first access point is storing the requested data, and if the first access point is storing the requested data then the first access point serves the user equipment; and
a determining device which, if the first access point determines that the first access point is not storing the requested data, determines whether a second access point in the plurality of access points is storing the requested data, and if the determining device determines that the second access point is storing the requested data, then the determining device initiates a handover of the user equipment to the second access point.

16. The wireless network of claim 15, wherein the determining device comprises a storage device which stores information regarding data being stored at the plurality of access points, the determining device determining whether the second access point in the plurality of access points is storing the requested data by referring to the stored information,
wherein the storage device stores the information in a hash-table, and the determining device refers to the stored information by querying the hash-table, and
wherein the determining device comprises a content-based handover entity which includes the hash-table storing the information.

17. The wireless network of claim 16, further comprising:
a mobility management entity and serving gateway node connected to the first access point; and
a packet gateway node connected to the mobility management entity and serving gateway node,
wherein the content-based handover entity is included in one of the packet gateway node and the mobility management entity and serving gateway node.

18. The wireless network of claim 17, further comprising:
a core IP network connected to the packet gateway node; and
a plurality of user equipments including the user equipment,
wherein the mobility management entity and serving gateway node manages a mobility of the plurality of user equipments across the plurality of access points and serves as a serving gateway for data, and the packet gateway node serves as a gateway to the core IP network.

19. The wireless network of claim 17, wherein the content-based handover entity is included in the packet gateway node and keeps track of the local cache of each access point in the plurality of access points that is served by the packet gateway node.

20. The wireless network of claim 15, wherein if it is determined that a plurality of other access points in the plurality of access points are storing the requested data, then one of the content-based handover entity and the first access point selects an optimum access point from among the plurality of other access points and initiates a handover of the user equipment to the selected optimum access point.

21. The wireless network of claim 20, wherein the one of the content-based handover entity and the first access point selects the optimum access point from the other access points based on a plurality of parameters including radio signal strength between the plurality of other access points and the user equipment, properties of the wireless network, and policy-based priorities assigned to the plurality of other access points.

22. The wireless network of claim 15, wherein the network comprises a Long Term Evolution (LTE) based network, and the first access point comprises an eNodeB which maintains a local cache storing data that has been downloaded by the eNodeB, and
wherein the local cache comprises one of a time-window based local cache in which the eNodeB stores data over a time-interval, and a priority based local cache in which the eNodeB stores data based on a content priority in a respective cell.

23. A method of handover in a wireless network including a plurality of user equipments, a plurality of access points serving the plurality of user equipments, and a packet gateway node serving the plurality of access points, the method comprising:
storing in a content-based handover entity, information regarding data being stored in a local cache of the plurality of access points;
transmitting a request for content from a user equipment in the plurality of user equipments to a first access point in the plurality of access points;
determining whether the local cache of the first access point is storing the content and if it is determined that the local cache is storing the content, then serving the user equipment with the first access point;
if it is determined that the local cache is not storing the content, then querying the content-based handover entity to determine whether other access points in the plurality of access points which are in a vicinity of the user equipment include a local cache storing the requested content;
if it is determined that the other access points in the plurality of access points in the vicinity do not include a local cache storing the requested content, then requesting the content from the packet gateway node and serving the user equipment with the first access point;
if it is determined that the other access points in the plurality of access points in the vicinity include a local cache storing the requested content, then performing an optimization to select an optimum access point from among the other access points in the vicinity which include the local cache storing the requested content; and
initiating a handover of the user equipment to the selected optimum access point and serving the user equipment with the selected optimum access point.

24. A wireless network, comprising:
a plurality of user equipments including a user equipment for making a request for data;
a plurality of access points including a first access point which receives the request for data from the user equipment, and which determines whether the first access point is storing the requested data and if the first access point is storing the requested data, then the first access point serves the user equipment;

a mobility management entity and serving gateway node connected to the plurality of access points and managing a mobility of the plurality of user equipments across the plurality of access points and serves as a serving gateway for data;

a packet gateway node connected to the mobility management entity and serving gateway node;

a core IP network connected to the packet gateway node, the packet gateway node serving as a gateway to the core IP network; and a content-based handover entity which is included in one of the packet gateway node and the mobility management entity and serving gateway node, and stores a hash-table including information regarding data being stored at the plurality of access points, and if the first access point determines that the first access point is not storing the requested data, then the first access point queries the hash-table to determine whether a second access point in the plurality of access points is storing the requested data, and if the first access point determines that the second access point is storing the requested data, then the first access point initiates a handover of the user equipment to the second access point.

25. A programmable non-transitory storage medium tangibly embodying a program of machine-readable instructions executable by a digital processing apparatus to perform a method of handover in a wireless network, the method comprising:

in response to a request for data from a user equipment connected to a first access point in the plurality of access points, determining whether the first access point is storing the requested data and if the first access point is storing the requested data, then serving the user equipment with the first access point;

if it is determined that the first access point is not storing the requested data, then determining whether a second access point in the plurality of access points is storing the requested data; and if it is determined that the second access point is storing the requested data, then initiating a handover of the user equipment to the second access point.

* * * * *